Patented June 19, 1934

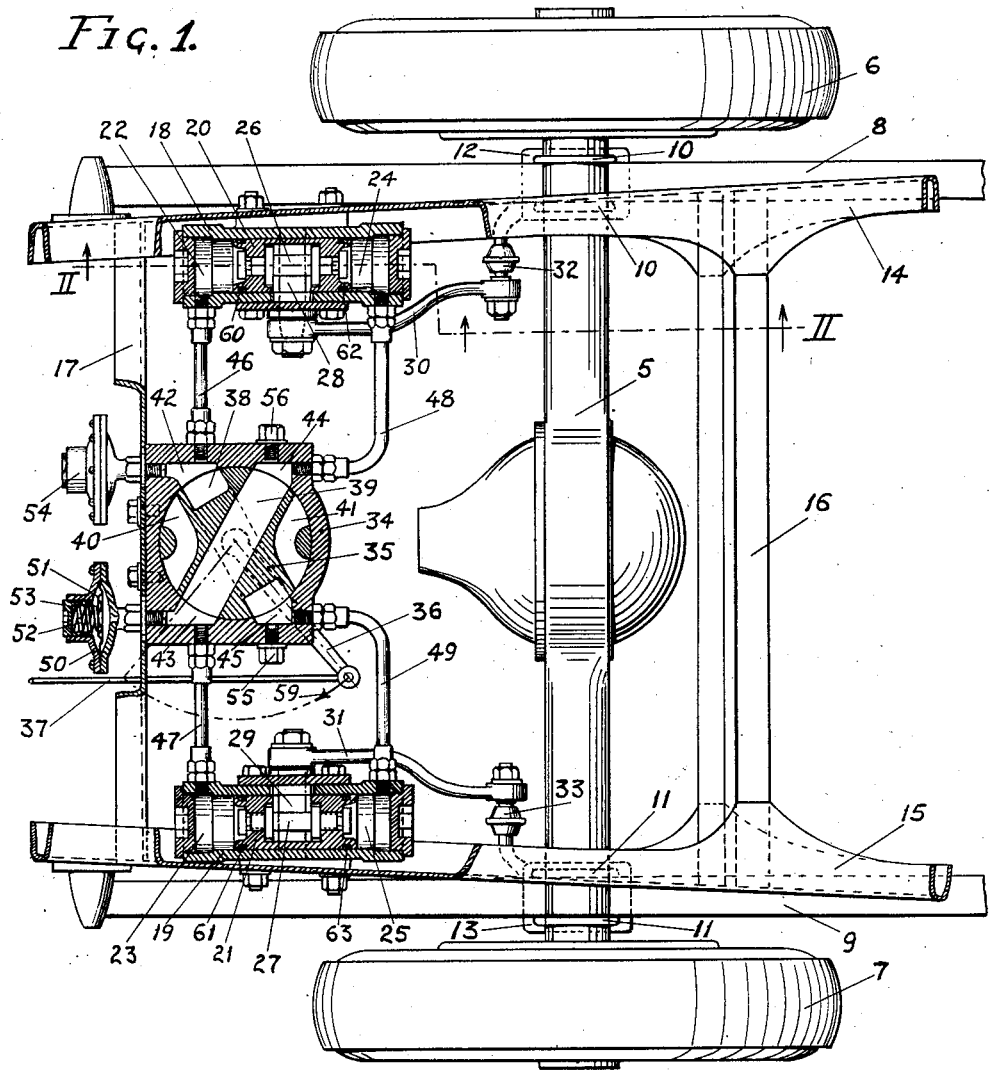

1,963,533

UNITED STATES PATENT OFFICE 1,963,533

STABILIZING AND SPRING CONTROLLING DEVICE

Gustav Waldemar Svensson, Torsas, Sweden, assignor, by mesne assignments, to Packard Motor Car Company, Detroit, Mich., a corporation of Michigan Application December 10, 1931, Serial No. 580,179

19 Claims. (Cl. 267—11)

My present invention relates to hydraulic stabilizing and spring controlling devices for vehicles, in which the frame or load carrying member is flexibly supported by spring suspension devices, connecting it with the axles or wheel carrying members.

An object of my invention is to provide means for preventing the vehicle frame and the body and load thereon from swaying or leaning over relatively to the axles or wheel carrying members.

Another object of my invention is to provide means for controlling the relative movements between the frame and the wheel carrying members by applying a suitable resistance to the compression as well as to the rebound of the vehicle springs, thereby serving the same purpose as two-way or double-acting shock absorbers.

A further object is the provision of means for adjusting the spring controlling action according to changes in road conditions, load, vehicle speed and temperature.

With the above and other objects in view, my invention consists in the new and useful construction, combination and arrangement of parts hereafter fully described and illustrated in the accompanying drawing showing a suitable embodiment of my invention, but it is to be understood that changes variations and modifications coming within the scope of the matter claimed hereafter may be resorted to.

Referring to the drawing forming a part of this specification:—

Fig. 1 is a plan view of the apparatus applied to the rear portion of an automobile with the mains parts of the apparatus shown in section, the hydraulic cylinders along the line I—I in Fig. 2.

Fig. 2 is a sectional side view along the line II—II in Fig. 1.

In the drawing the rear end of a motor car chassis is shown having the rear axle 5 carrying the rear wheels 6 and 7. Two longitudinal semi-elliptic springs 8 and 9 are each attached to the rear axle 5 by means of a pair of spring clips 10, 10 and 11, 11 and a clip plate 12 and 13, respectively. The springs 8 and 9 support the frame side members 14 and 15 connected with each other by cross members 16 and 17. Two hydraulic cylinders 18 and 19 are bolted to the inside of the frame side members 14 and 15, respectively. 20 designates a double-ended piston slidable in the cylinder 18 with a liquid tight fit and dividing same into two hydraulic chambers 22 and 24. In the same way a piston 21 is slidable in the cylinder 19 dividing same into two chambers 23 and 25.

Piston 20 is actuated by a cam member 26 secured to a camshaft 28 extending outside the cylinder 18. Bolted to the outer end of said shaft 28 is one end of a lever 30 connected at its opposite end to the spring clips 10, 10 by means of a ball-jointed link 32.

In exactly the same way piston 21 is actuated by a cam member 27 secured to a camshaft 29 to which is bolted a lever 31 connected to the spring clips 11, 11 by a ball-jointed link 33.

Bolted to the cross member 17 between the cylinders 18 and 19 is a valve housing 34 having a circular valve disc 35 which has a liquid tight fit in said valve housing and may be turned through a certain angle by means of a lever 36 actuated from the drivers seat by the rod 37. Formed in the valve disc 35 are two straight ducts 38 and 39 crossing each other and two other crescent-shaped ducts 40 and 41. When the valve disc 35 occupies the position shown in Fig. 1, the ends of duct 38 register with pockets 42 and 45 and the ends of duct 39 with pockets 43 and 44 said pockets 42 to 45 inclusive being formed in the valve housing 34. Four pipes 46, 47, 48 and 49 connect hydraulic chambers 22, 23, 24 and 25 with pockets 42, 43, 44 and 45 respectively. Pocket 43 communicates with an expansion bell 50 of known type comprising a concentrically corrugated diaphragm 51 actuated by a strong coil spring 52 pressing against the outer surface thereof and housed in a hollow screw plug 53, whereby the initial tension of the spring may be adjusted so as to permit control of the resistance to liquid pressure. Pocket 42 communicates with an expansion bell 54 of exactly the same construction.

With the valve disc 35 in the position as shown in Fig. 1 there are two hydraulic systems liquid tightly sealed from each other, the one system comprising chamber 22, pipe 46, pocket 42 with expansion bell 54, duct 38, pocket 45, pipe 49 and chamber 25, and the other system comprising chamber 24, pipe 48, pocket 44, duct 39, pocket 43 with expansion bell 50, pipe 47 and chamber 23. The hydraulic systems may be filled with a suitable liquid by removing the screw plugs 55 and 56, respectively, screwed into valve housing 34. When filling the separate systems with liquid, air is permitted to escape by removing the screw plugs on top of the four hydraulic chambers 22, 23, 24 and 25, only the air plugs 57 and 58 of the chambers 22 and 24 being shown in the drawing in Fig. 2.

The stabilizing action of the apparatus described above may be most clearly illustrated by an example. Suppose, for instance, that the vehicle shown in Fig. 1 is taking a curve turning to the left at a relatively high speed. The centrifugal force set up by the curve causes a tendency of the body and the frame of the vehicle to lean over to the right, whereby the righthand spring 8 is compressed which means a relative movement between the frame side member 14 and the righthand end of the rear axle 5 towards one another. Thereby link 32 turns the outer end of lever 30 upwardly causing cam member 26 to move piston 20 forwardly, thereby reducing the volume of chamber 22. Consequently, a certain volume of liquid is forced from chamber 22 through pipe 46 to valve pocket 42 and further through duct 38 to pocket 45 and through pipe 49 to chamber 25 on the lefthand side of the vehicle. Piston 21 will, consequently, be forced forwardly, thereby turning cam member 27 so as to move the outer end of lever 31 upwardly. The result will be that the frame side member 15 will be pulled downwardly, compressing the lefthand spring 9 to exactly the same degree as the spring 8 was compressed by the centrifugal force at the previous moment. On account of the forward movement of piston 21 liquid will be forced from chamber 23 to chamber 24, the volume of which was increased due to the forward movement of piston 20.

From the above example it will be readily understood that a relative movement in either direction between the frame side member and the axle at one side of the vehicle will immediately bring about an exactly similar movement on the opposite side, i. e. the frame and the axle will always move in parallel to one another. The leaning over of the body and frame of the vehicle, i. e. the side-swaying will thereby practically be rendered impossible, thus eliminating the most common reason for skidding. As skidding is the cause of a large percentage of automobile accidents, the importance of this stabilizing action is readily understood.

Simultaneously with the stabilizing action the spring controlling action of the apparatus is obtained by the resistance offered by the flowing liquid to rapid movements between the frame and the axle in connection with the compression or rebound movements of the springs. It is a well known fact that, if a liquid is forced through a restricted opening, the resistance of the liquid will vary in proportion to the square of the velocity. In this case the resistance may be adjusted by turning the valve disc 35 by means of rod 37 connected with lever 36. When valve disc 35 occupies the position shown in Fig. 1, the communication between ducts 38 and 39 and pockets 42, 45 and 43, 44, respectively, is entirely unrestricted. In this position the resistance offered by the liquid flow against the spring movements is a minimum, corresponding to the softest riding obtainable with the apparatus. If a harder riding is desired, valve disc 35 is turned in the direction indicated by the arrow 59, whereby the communication between ducts 38 and 39 and pockets 42, 45 and 43, 44, respectively, will be somewhat restricted with a consequent greater liquid resistance.

If the valve disc 35 is turned still farther into the position in which duct 38 extends in parallel to the rear axle 5 and cross member 17, duct 38 will connect all four pockets 42, 43, 44 and 45 with one another the free openings of said duct 38 being somewhat wider than the thickness of the wall separating pockets 42, 44 and 43, 45, respectively, so that the four hydraulic chambers will also become connected. Such a connection between the two separate hydraulic systems may prove necessary in order to restore an equal distribution of liquid in the two systems. The equilibrium in the distribution of liquid may have been disturbed by liquid leaking over from one hydraulic chamber past the piston to the other chamber in the same cylinder. Such leakage may for instance be caused by a one sided load carried on for a considerable period of time. In order to reduce such leakage to a minimum it may prove necessary to provide the pistons 20 and 21 with piston rings as shown in Figs. 1 and 2, in which such rings 60, 62 and 61, 63, respectively, are shown at opposite ends of the pistons.

If valve disc 35 is turned still farther, the crescent-shaped ducts 40 and 41 will open a narrow connection between pockets 42, 44 and 43, 45, respectively, thus permitting a somewhat restricted liquid flow between the hydraulic chambers 22, 24 and 23, 25, respectively. With valve disc 35 in this position two new separate hydraulic systems will be formed, one system comprising chambers 22 and 24 in cylinder 18, pipes 46 and 48, pockets 42 and 44, and duct 40, and the other system comprising chambers 23 and 25 in cylinder 19, pipes 47 and 49, pockets 43 and 45 and duct 41. In this position the apparatus will have no direct stabilizing action but will practically represent two separate double-acting hydraulic shock absorbers. It may be readily understood that by turning the valve disc 35 the openings between the ducts 40, 41 and the pockets 42, 44 and 43, 45 respectively, may be more or less restricted thereby effecting a spring controlling action for harder or softer riding.

Independent of the position of valve disc 35, the separate hydraulic systems are each always in connection with one of the expansion bells 50 and 54 serving the purpose of preventing by spring action the different parts of the apparatus from being subjected to undue stresses caused by sudden shocks. The expansion bells also protect the apparatus from damage caused by the expansion of the liquid through heat.

The stabilizing and spring controlling apparatus described in the foregoing has been applied to the rear wheels of a motor vehicle, but it is obvious that the same apparatus may be applied to the two front wheels or to one front wheel and one rear wheel on the same side, or even to one front wheel on one side and the rear wheel on the opposite side.

In the embodiment of my invention described above cylindrical hydraulic chambers with pistons actuated by cam and lever have been used. It is obvious that the invention is not confined to this special construction. The hydraulic chambers may, for instance, have annular shape and may be liquid tightly separated by an oscillating vane actuated by a lever connected by a link to the wheel carrying member.

The construction of the adjusting valve may also be varied without departing from the scope of my invention. It may, for instance, have a valve slide instead of the turnable disc as described above.

It is also obvious that certain makes of double-acting hydraulic shock absorbers now generally used by many automobile manufacturers may be converted into a stabilizing and spring controlling apparatus according to my invention by combining two such shock absorbers by means of pipe connections and ducts between the four hydraulic chambers as described above. Of course, such a modified apparatus will come within the scope of my present invention.

It will be seen from the above description that several parts of the apparatus in accordance with my invention are the same and serve the same purpose as corresponding parts of double-acting hydraulic shock absorbers now on the market. Due to this fact I have found it advantageous to use, in the appended claims, two terms generally accepted for hydraulic shock absorbers, viz. the terms "compression chamber" and "rebound chamber", the former term designating the hydraulic chamber from which liquid is forced by movements involving a compression of the vehicle spring, and the latter designating the hydraulic chamber from which liquid is forced by the rebound movements of the vehicle spring.

Having thus described my invention what I claim and desire to protect by Letters Patent is:

1. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, a pipe connection including a valve between the compression chamber of the one container and the rebound chamber of the other container, a pipe connection including the same valve between the rebound chamber of the first container and the compression chamber of the second container, and means to control said valve.

2. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, means including a valve to connect the compression chamber of the one container with the rebound chamber of the other container, means including the same valve to connect the rebound chamber of the first container with the compression chamber of the second container, and means to control said valve so as to vary the liquid flow therethrough.

3. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, means including a valve and a passage in said valve to connect the compression chamber of the one container with the rebound chamber of the second container, means including the same valve and another passage in said valve to connect the rebound chamber of the first container with the compression chamber of the second container, and means to control said valve so as to vary the liquid flow through both said passages simultaneously and in the same proportion.

4. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, a valve housing communicating with both chambers of each container and having a valve body provided with a passage to connect the compression chamber of the one container with the rebound chamber of the other container, another passage to connect the rebound chamber of the first container with the compression chamber of the second container and two further passages to connect the two chambers of each container with each other.

5. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, a pipe connection including a valve and shock absorbing means between the compression chamber of the one container and the rebound chamber of the other container, a pipe connection including the same valve and another shock abscrbing means between the rebound chamber of the first container and the compression chamber of the second container, and means to control said valve.

6. A hydraulic stabilizing and spring controlling apparatus for vehicles in which the vehicle frame is connected with the wheels by means of springs, comprising two liquid cylinders each having a compression chamber and a rebound chamber liquid tightly separated from each other by means of a reciprocating piston, each of said pistons being adapted to be displaced by the compression and rebound movements of one of the vehicle springs so as to cause increase of the volume of the one chamber and corresponding decrease of that of the other chamber, a pipe connection including a rotary valve between the compression chamber of the one cylinder and the rebound chamber of the other cylinder, a pipe connection including the same rotary valve between the rebound chamber of the first cylinder and the compression chamber of the second cylinder, and means to turn said rotary valve.

7. A hydraulic stabilizing and spring controlling apparatus for vehicles in which the vehicle frame is connected with the wheels by means of springs, comprising two containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, means to transfer liquid between the compression chamber of the one container and the rebound chamber of the other container and vice versa and means to set all four chambers into communication with one another.

8. A hydraulic stabilizing and spring controlling apparatus for vehicles in which the vehicle frame is connected with the wheels by means of springs, comprising two liquid containers each having a compression chamber and a rebound chamber liquid tightly separated from each other by means of a movable member, each of said members being adapted to be displaced by the compression and rebound movements of one of the vehicle springs so as to cause increase of the volume of the one chamber and corresponding decrease of that of the other chamber, a valve housing communicating with both chambers of each container and having an adjustable valve body provided with passages so as to permit communication in one position of said valve body between the compression chamber of one container and the rebound chamber of the other container and vice versa, in another position between all four chambers and in a third position between the two chambers of each container.

9. A hydraulic stabilizing and spring controlling apparatus for vehicles in which the vehicle frame is connected with the wheels by means of springs, comprising two liquid containers each having a compression chamber and a rebound chamber separated by a movable member, each of said members being adapted to be displaced by the compression and rebound movements of one of the vehicle springs so as to cause increase of the volume of one chamber and corresponding decrease of the other chamber, means including a two-way valve connecting the compression chambers with the rebound chambers of different containers, and means for adjusting said valve to regulate the rate of liquid flow through the connection means in both directions.

10. A hydraulic stabilizing and spring controlling apparatus for vehicles in which the vehicle frame is connected with the wheels by means of springs, comprising two liquid containers each having a compression chamber and a rebound chamber separated by a movable member, each of said members being adapted to be displaced by the compression and rebound movements of one of the vehicle springs so as to cause increase of the volume of one chamber and corresponding decrease of the other chamber, means including a two-way valve connecting the chambers in each container or different chambers in the two containers, and means for adjusting said valve to regulate the position and rate of liquid flow through the connecting means.

11. In a shock absorber apparatus for vehicles in which the vehicle frame is connected with the wheels by means of springs, a pair of liquid containers each having a compression chamber and a rebound chamber separated by a movable member, a connection between the chambers of each liquid container, a valve establishing closed circuits between the connections of each container and regulating the flow in either direction through said connections, and manually operable means for adjusting said valve.

12. Shock absorber means for vehicles in which the vehicle frame is connected with the wheels by means of springs, comprising two liquid containers each having a compression chamber and a rebound chamber separated by a movable member, each of said members being adapted to be displaced by compression and rebound movements of one of the vehicle springs so as to cause increase of the volume of one chamber and corresponding decrease of the other chamber, connections between the chambers of each liquid container including a rotary valve establishing closed circuits, said valve regulating the rate of flow through said connections, and manually operable mechanism for rotating said valve.

13. A hydraulic stabilizing and spring controlling apparatus for vehicles in which the vehicle frame is connected with the wheels by means of springs, comprising two liquid containers each having a compression chamber and a rebound chamber separated by means of a movable member, each of said members being adapted to be displaced by the compression and rebound movements of one of the vehicle springs so as to cause increase of the volume of one chamber and corresponding decrease of the volume of the other chamber, connection means including a valved housing connecting the compression chambers with the rebound chambers, and pressure relief means associated with the valved housing.

14. A hydraulic stabilizing and spring controlling apparatus for vehicles in which the vehicle frame is connected with the wheels by means of springs, comprising two liquid containers each having a compression chamber and a rebound chamber separated from each other by means of a movable member, each of said members being adapted to be displaced by the compression and rebound movements of one of the vehicle springs so as to cause increase of the volume of one chamber and corresponding decrease of the volume of the other chamber, means including a valve connecting the compression chambers and the rebound chambers of opposite containers in a closed circuit, and remote valve control means adapted to be manually operated.

15. A hydraulic stabilizing and spring controlling apparatus for vehicles in which the vehicle frame is connected with the wheels by means of springs, comprising two liquid containers each having a compression chamber and a rebound chamber separated from each other by means of a movable member, each of said members being adapted to be displaced by the compression and rebound movements of one of the vehicle springs so as to cause increase of the volume of one chamber and corresponding decrease of that of the other chamber, a housing, pipe connections between the housing and each of the chambers, and an adjustable valve in said housing, said valve being formed to connect the pipe connections of each liquid container or the pipe connections between the compression chambers and the rebound chambers of opposite liquid containers or for connecting all of the pipe connections, the adjustment of said valve being such as to regulate the rate of flow through the pipe connections in any of the relations set forth.

16. In a vehicle having a frame and two opposed wheels carrying said frame and each carried by a wheel carrying member permitting relative movements between the frame and the corresponding wheel, means including communicating fluid systems disposed at opposite sides of the frame to transmit a relative movement between the frame and the wheel on one side of the vehicle to an equal relative movement between the frame and the wheel on the opposite side of the vehicle, and means controlling communication between the systems to put said transmitting means into and out of action.

17. In a vehicle having a frame and two opposed wheels carrying said frame and each carried by a wheel carrying member permitting relative movements between the frame and the corresponding wheel, means to transmit a relative movement between the frame and the wheel on one side of the vehicle to an equal relative movement between the frame and the wheel on the opposite side of the vehicle, and manually operable means to control said transmitting means.

18. In a vehicle having shock absorbers, means to connect two shock absorbers on opposite sides of the vehicle so as to cause the shock absorber actually not actuated to effect a similar action as that of the shock absorber actually actuated while normally permitting said shock absorbers to act independently of each other, and means to control said connecting means.

19. In a vehicle having a frame and two opposed wheels carrying said frame and each carried by a wheel carrying member permitting relative movements between said frame and the corresponding wheel, a shock absorber on each side of the vehicle interposed between the frame and the corresponding wheel carrying member to damp such relative movements, means including an adjustable member to connect said shock absorbers with each other, said adjustable member being adapted normally to permit said shock absorbers to act independently of each other, and means to set said adjusting member so as to cause the shock absorber actually not actuated to effect a similar action as that of the shock absorber actually actuated.

GUSTAV WALDEMAR SVENSSON.